United States Patent
Gambarelli et al.

(10) Patent No.: US 6,848,491 B2
(45) Date of Patent: Feb. 1, 2005

(54) COVER FOR STORAGE SPACE AFFORDING ACCESS TO A SELECTED PART THEREOF

(75) Inventors: Franco Gambarelli, Spezzano di Fiorano (IT); Claudio Mazzetti, Modena (IT)

(73) Assignee: Swisslog Italia S.p.A., Milan (IT)

( * ) Notice: Subject to any disclaimer, the term of this patent is extended or adjusted under 35 U.S.C. 154(b) by 5 days.

(21) Appl. No.: 10/398,646

(22) PCT Filed: Aug. 21, 2001

(86) PCT No.: PCT/IT01/00446

§ 371 (c)(1),
(2), (4) Date: Apr. 4, 2003

(87) PCT Pub. No.: WO02/29194

PCT Pub. Date: Apr. 11, 2002

(65) Prior Publication Data

US 2004/0031574 A1 Feb. 19, 2004

(30) Foreign Application Priority Data

Oct. 5, 2000 (IT) .................................. MO2000A0214

(51) Int. Cl.[7] .............................................. E06B 9/08
(52) U.S. Cl. ..................................... 160/122; 160/241
(58) Field of Search ............................ 160/122, 121.1, 160/120, 241, 85, 86

(56) References Cited

U.S. PATENT DOCUMENTS

| | | | | |
|---|---|---|---|---|
| 1,857,368 A | * | 5/1932 | Flynn et al. | 359/450 |
| 1,857,673 A | * | 5/1932 | Vallen | 359/450 |
| 1,882,828 A | * | 10/1932 | Samuel et al. | 359/450 |
| 3,386,489 A | * | 6/1968 | Denton et al. | 160/25 |
| 3,926,242 A | * | 12/1975 | Lowe | 160/89 |
| 4,096,902 A | * | 6/1978 | Junod | 160/122 |
| 5,052,459 A | | 10/1991 | Grossenbacher | |
| 5,178,199 A | * | 1/1993 | Jackson | 160/87 |
| 5,560,415 A | * | 10/1996 | Geissler | 160/220 |
| 6,003,583 A | * | 12/1999 | Lacoste et al. | 160/122 |
| 6,116,830 A | * | 9/2000 | Azema | 409/134 |
| 6,450,598 B1 | * | 9/2002 | Hanel | 312/268 |
| 6,561,250 B2 | * | 5/2003 | Hutchins | 160/89 |

FOREIGN PATENT DOCUMENTS

WO    WO 99/43234    9/1999

* cited by examiner

*Primary Examiner*—David Purol
(74) *Attorney, Agent, or Firm*—Flynn, Thiel, Boutell & Tanis, P.C.

(57) ABSTRACT

A cover affords access to a selected part of a storage space. The arrangement provides at least one opening which can be configured and positioned at any location on the cover. The opening provides access to a limited area of the storage space.

19 Claims, 2 Drawing Sheets

COVER FOR STORAGE SPACE AFFORDING ACCESS TO A SELECTED PART THEREOF

TECHNICAL FIELD

The invention is usefully applied in the field of applications for closing cupboards and/or shelves destined to contain objects of various natures and sizes. One very useful application of the invention is in the medical supplies field

BACKGROUND ART

Covers of known type, constituted by doors or hatches and the like, generally exhibit the characteristic of being structured with openings which normally afford indiscriminate access to a whole range of stored objects. This usually means that once the door is open a certain time is required for searching out and identifying the object or objects sought.

Apart from the fact that this can lead to errors, numerous other drawbacks are incurred, all due to the fact that many objects are revealed by a single opening of the cover, usually a door.

The main aim of the present invention is to obviate the limitations and drawbacks inherent in the prior art.

In particular the invention proposes to provide a selective opening, which enables a determined section of space to be revealed, both in terms of size and position of the space.

A further aim is to enable precise and rapid identification of the position of single objects or groups of objects.

An advantage of the invention is to make both the object storing and retrieving operations extremely simple and rapid.

These aims and advantages and others besides are all achieved by the present invention, as it is characterised in the claims that follow.

Further advantages of the present invention will better emerge from the detailed description that follows of a preferred but non-exclusive embodiment of the invention, illustrated purely by way of non-limiting example in the accompanying figures of the drawings, in which.

DISCLOSURE OF THE INVENTION

Figure 1:
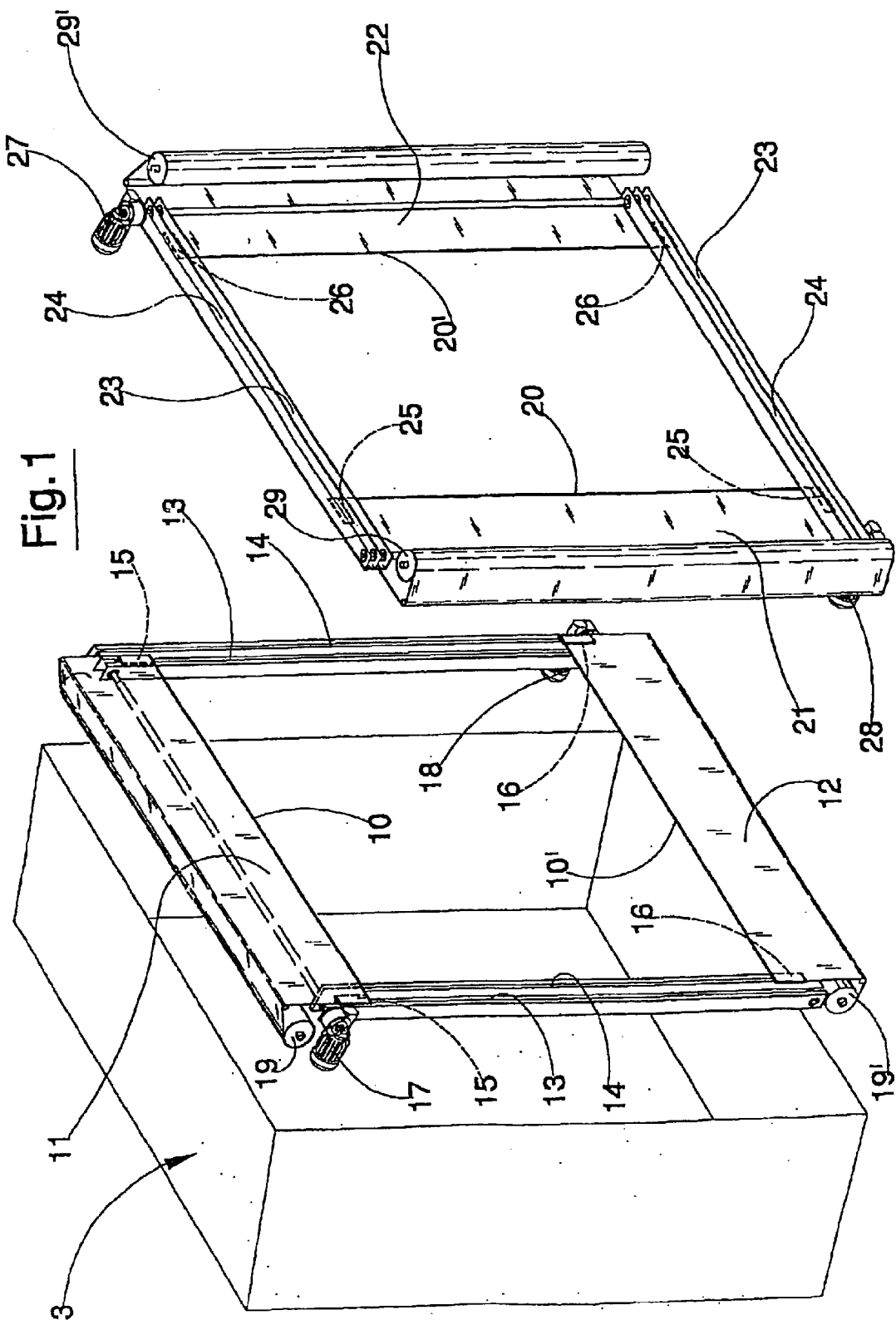
FIG. 1 is an exploded schematic perspective view of the invention.
Figure 2:
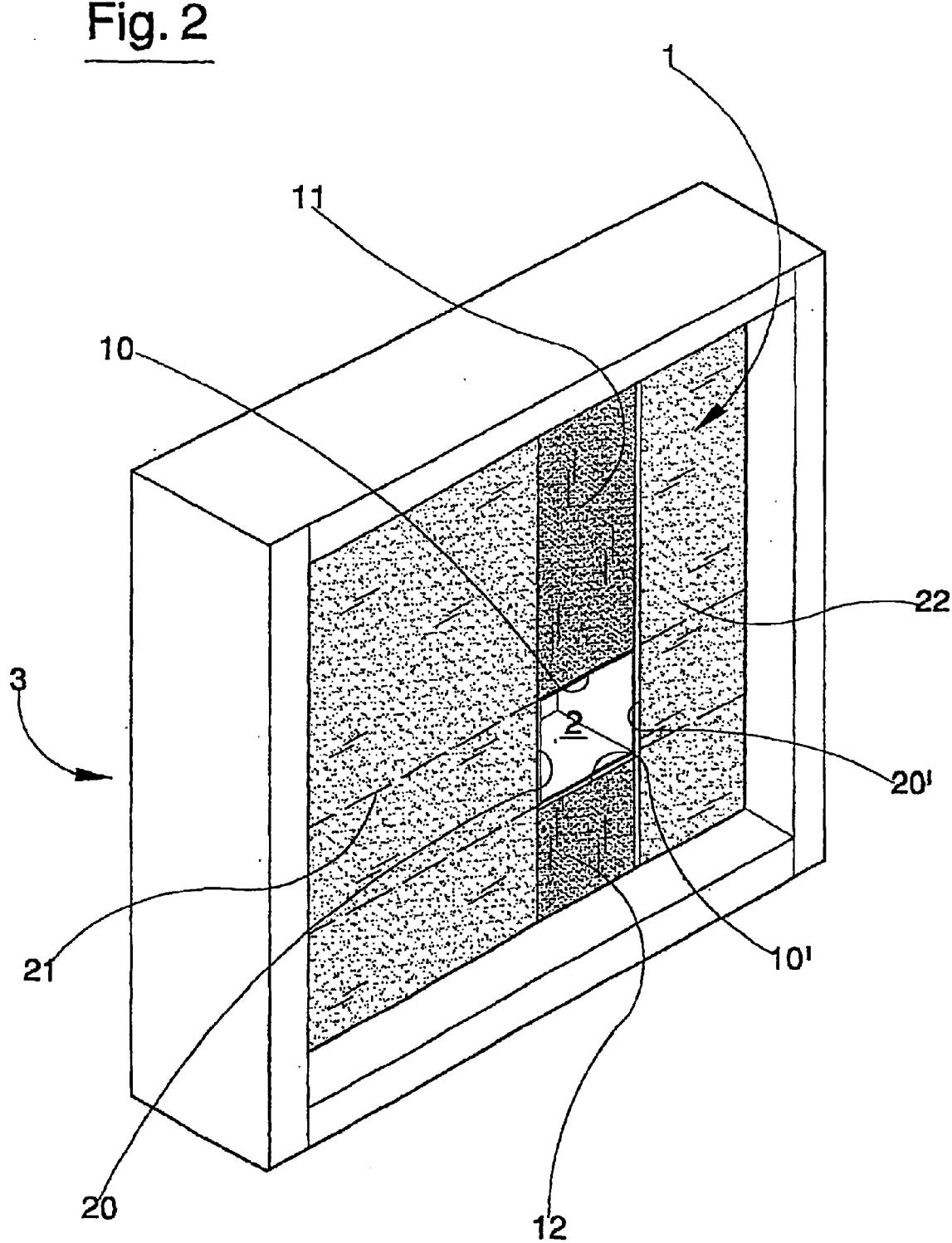
FIG. 2 is an overall schematic perspective view.

With reference to the figures of the drawings, 1 denotes in its entirety a cover for closing off a defined area, in the example a vertical storage space 3 (but which could be horizontal) which comprises means for generating at least one opening 2 which exhibits the characteristic of being configurable and positionable in any way, so that a defined zone of limited access to the space 3 is afforded.

The means for generating the opening 2 comprise at least a first pair of surfaces which are guided to move in at least a first direction (in the example, a vertical direction) and which are positionable along the first direction in any position; the free edges 10 and 10' of the first pair of surfaces are arranged at a predetermined distance one from the other so as to define a first gap of predetermined size. The free edges 10 and 10' can be brought completely together to render the space between them null.

At least a second pair of surfaces are exhibited, guided to move in at least a second direction, not parallel to the first direction and positionable in any position along the second direction, at which the free edges 20 and 20' of the second pair of surfaces are arranged at a predetermined distance one from the other so as to define a second gap of predetermined size (which can be null). The second gap is arranged transversally to the first gap and is at least partially superposed thereon.

The first pair of surfaces are constituted by two first screens 11, 12 which are commanded to translate along parallel guides 13 and 14.

Similarly the second pair of surfaces is constituted by two second screens 21, 22, which are commanded to translate along parallel guides 23 and 24, transversally arranged with respect to parallel guides 13 and 14.

The first screens 11 and 12 are respectively fixed to first guide devices 15 and 16, slidably coupled with the parallel guides 13 and 14.

The first guide devices 15 and 16 are commanded to translate along the parallel guides 13 and 14 by mechanical transmissions of known type which are powered by gear reducers 17 and 18.

The first screens 11, 12 are fixed at their free ends 10 and 10' respectively to the first guide devices 15 and 16.

First roller devices 19 and 19' are provided to gather up the first screens 11 and 12 starting from opposite ends to the respective free ends 10 and 10'.

Similarly, the second screens 21 and 22 are respectively fixed to second guide devices 25 and 26, coupled with the second guides 23 and 24.

The second guide devices 25 and 26 are commanded to translate along the guides 23 and 24 by mechanical transmissions powered by gear reducers 27 and 28.

The second screens 21 and 22 are fixed at their free ends 20 and 20' respectively to the second guide devices 25 and 26.

Second roller devices 29 and 29' are provided to gather up the second screens 21 and 22 starting from opposite ends to the respective free ends 20 and 20'.

The first screens 11, 12 and the second screens 21, 22 are moved independently from each other in the two directions along the respective guides, by action of the gear reducers 17, 18 and 27, 28, which are commanded by a control unit which enables the single free edges 10, 10' and 20, 20' to be positioned independently in the designated storage space 3.

Thus an opening 2 can be created in the cover 1 which is constituted by the superposing of the two gaps comprised between the free ends 10, 10' and 20, 20' and which can be configured—in the example the shape is a rectangle—according to predetermined dimensions and positioned with precision in a pre-selected area of the storage space 3.

In other words, a window can be opened in the space 3, which window will be of the desired size and in the desired position, so as to enable access only to a well-defined zone of the storage space 3.

The control unit is provided with a memory, in which the various, opening positioned assumed by the screens are stored; the opening positions can correspond to the objects stored in the storage space 3 behind those positions.

Thus any memorised position can be called up, making the operation of finding an object in the storage space 3 very simple and rapid.

Not only is the retrieval of the desired object made much easier, as well as making it very difficult to commit errors, but also access is given only to that part of the storage space 3 in which the sought object is stored. This guarantees protection of all remaining parts of the storage space 3, which remain closed off by the screens and therefore inviolable and inaccessible.

In some cases, in order to improve the inviolability of the screens (even where strong screens are used), it is possible to use proper slatted shutters.

What is claimed is:

1. A cover for storage space allowing access to a selected part thereof, comprising a first pair of first surfaces guided for movement along a first direction, each first surface comprising a respective first side edge adapted to selectively generate a first gap of variable size along said first direction, wherein the cover further comprises at least a second pair of second surfaces guided for movement along at least a second, different direction, each said second surface comprising a respective second side edge adapted to selectively generate at least a second gap of variable size along said at least second direction, said at least second pair of second surfaces being at least partially superposed on the first pair of surfaces so as to selectively superpose, in use, said at least second gap on said first gap to define an access opening limited by said first and second side edges, wherein the cover further comprises a first pair of parallel guides and a second pair of parallel guides for guiding said first and at least second surfaces along said first and at least second directions, respectively, wherein the cover further comprises actuating means including guide devices connected to the side edges of the surfaces and slidably coupled to the parallel guides, and including gear reducers connected to the guide devices in order to independently move the surfaces along both the directions.

2. A cover according to claim 1, wherein the at least second pair of surfaces is arranged transverse with respect to the first pair of surfaces.

3. A cover according to claim 1, wherein the first and the second pair of surfaces each comprise two screens.

4. A cover according to claim 1, wherein the parallel guides of the first guide device are arranged transverse with respect to the parallel guides of the second guide device.

5. A cover according to claim 4, wherein the cover comprise at least one roller device connected to at least one said surface in order to gather up, in use, the surface starting from an opposite end thereof to the side edge.

6. A cover for storage space allowing access to selected part thereof, comprising:
   a first pair of first surface guided for movement along a first direction, each first surface comprising a respective first side edge dated to selectively generate a first gap of variable size along said first direction;
   at least a second pair of a second surface guided for movement along at least a second, different direction, each said second surface comprising a respective second side edge adapted to selectively generate at least a second gap of variable size along said at least second direction, said at least second pair of second surfaces being at least partially superposed on the first pair of surfaces so as to selectively superpose, in use, said at least second gap on said first gap to define an access opening limited by said first and second side edges; and
   a control unit connected to the actuating means and provided with a memory in which various positions of selectable areas of the storage space may be stored, any stored position being recallable by a user,
   wherein some of the selectable areas are located in directions away from and do not include a center part of the storage space.

7. A cover for providing no access or limited access to an interior of a storage space, comprising:
   a first pair of cover elements for movement toward and away from each other along a first forward direction or an opposing first reverse direction, said cover elements having facing parallel edges to form a gap of variable size therebetween;
   a second pair of cover elements for movement toward and away from each other along a second forward direction or a second opposing reverse direction, the second forward and reverse directions both being transverse from the first forward and reverse directions, said cover elements of said second pair of said cover elements having facing parallel edges to form a gap of variable size therebetween, the second pair of said cover elements being at least partially superposed on the first pair of said cover elements; and
   a control unit for controlling each said cover element of said first pair of the cover elements and each said cover element of said second pair of the cover elements separately and independently to provide an access opening having a selected size and selected location that opens into the storage space.

8. The cover of claim 7, including first and second pairs of guide devices for moving the first pair of said cover elements in the first forward and reverse directions independently from each other, each of said guide devices including a gear reducer, each said pair of guide devices enabling independent movement of the respective said cover element.

9. The cover of claim 7, including first and second pairs of parallel guides for supporting the first pair of said cover elements for the separate and independent movement toward and away from each other in the first forward and reverse directions.

10. The cover of claim 9, including third and fourth pairs of parallel guides for supporting the second pair of said cover elements for the separate and independent movement toward and away from each other in the second forward and reverse directions.

11. The cover of claim 10, including first and second pairs of guide devices fixedly secured at side edges at adjacent ends of the cover elements of said first pair of said cover elements and slidably coupled to the respective parallel guides for moving the first pair of said cover elements along the parallel guides in the first forward and reverse directions independently from each other.

12. The cover of claim 11, including third and fourth pairs of guide devices fixedly secured at side edges at adjacent ends of the cover elements of said second pair of said cover elements and slidably coupled to the respective parallel guides for moving the second pair of cover elements along the respective parallel guides in the second forward and reverse directions independently from each other.

13. The cover of claim 12, including a plurality of roller devices, each of said roller devices corresponding to one of said cover elements, each said roller device receiving an end of the respective said cover element along the length thereof and each said roller device configured to gather up the respective cover element when the selected access opening is increased by moving of the respective said cover element.

14. The cover of claim 7, wherein each said cover element of the first and second pairs of said cover elements comprises a screen.

15. The cover of claim 12, wherein the control unit includes a memory storing various opening positions for the cover elements, the positions corresponding to the locations of objects stored behind the cover elements.

16. The cover of claim 7, wherein the control unit includes a memory storing various opening positions for the cover elements, the positions corresponding to the locations of objects stored behind the cover elements.

17. A cover for providing no access or limited access to an interior of a storage space, comprising:

a first pair of parallel guides;

a second pair of parallel guides spaced from and parallel to the first pair of parallel guides;

a first roller device mounted transverse to the first and second pairs of parallel guides and having first and second ends, the first end of said first roller device being positioned adjacent a first end of said first pair of parallel guides and the second end of said first roller device being positioned adjacent a first end of said second pair of parallel guide s;

a first cover element having a first end fixedly secured along a width thereof to said first roller device;

a first pair of guide devices fixedly secured at side edges adjacent a second end of said first cover element, each of said guide devices being slidably coupled to a respective one of said first and second pairs of parallel guides;

a first gear reducer connected to one of the first pair of said guide devices; and a control unit for controlling a position of said first cover element, wherein said first roller device is capable of gathering said first cover element.

18. The cover of claim 17, further comprising:

a second roller device having first and second ends, said second roller device being mounted transverse to the first and second pairs of parallel guides, the first end of said second roller device being positioned adjacent a second end of said first pair of parallel guides and a second end of said second roller device being positioned adjacent a second end of said second pair of parallel guides;

a second cover element having a first end fixedly secured along a width thereof to said second roller device; and a second pair of guide devices fixedly secured at side edges adjacent a second end of said second cover element, each of said second pair of guide devices being slidably coupled to a respective one of said first and second pairs of parallel guides, wherein said control unit controls a position of said second cover element independently from the position of said first cover element.

19. The cover of claim 18, further comprising:

a third pair of parallel guides;

a fourth pair of parallel guides spaced from and parallel to the third pair of parallel guides;

a third roller device mounted transverse to the third and fourth pairs of parallel guides and having first and second ends, the first end of said third roller device being positioned adjacent a first end of said third pair of said parallel guides and a second end of said third roller device being positioned adjacent a first end of said fourth pair of said parallel guides;

a third cover element having a first end fixedly secured along a width thereof to said third roller device; and a third pair of guide devices fixedly secured at side edges adjacent a second end of said third .cover element, each of said third pair of guide devices being slidably coupled to a respective one of said third and fourth pairs of parallel guides, wherein said third roller device is capable of gathering said third cover element, and said control unit controls a position of said third cover element independently from the positions of said first and second cover elements.

* * * * *